United States Patent
Kuo et al.

(10) Patent No.: US 11,367,306 B1
(45) Date of Patent: Jun. 21, 2022

(54) SYSTEM TO DETERMINE USER ENGAGEMENT WITH AUTONOMOUS MOBILE DEVICE

(71) Applicant: AMAZON TECHNOLOGIES, INC., Seattle, WA (US)

(72) Inventors: Cheng-Hao Kuo, Kirkland, WA (US); Anuja Shantaram Dawane, Sunnyvale, CA (US); Che-Chun Su, Renton, WA (US); Jingjing Zheng, Bellevue, WA (US); Jim Oommen Thomas, Kenmore, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 55 days.

(21) Appl. No.: 16/909,074

(22) Filed: Jun. 23, 2020

(51) Int. Cl.
| | |
|---|---|
| *G06V 40/16* | (2022.01) |
| *H04N 5/232* | (2006.01) |
| *G06V 10/75* | (2022.01) |
| *G06V 40/20* | (2022.01) |

(52) U.S. Cl.
CPC .......... *G06V 40/166* (2022.01); *G06V 10/751* (2022.01); *G06V 40/168* (2022.01); *G06V 40/172* (2022.01); *G06V 40/23* (2022.01); *H04N 5/23219* (2013.01)

(58) Field of Classification Search
CPC .......... G06K 9/00255; G06K 9/00268; G06K 9/00342; G06K 9/00288; G06K 9/6202; H04N 5/23219
See application file for complete search history.

(56) References Cited

U.S. PATENT DOCUMENTS

| | | | | |
|---|---|---|---|---|
| 9,866,820 | B1* | 1/2018 | Agrawal | H04N 13/239 |
| 10,489,912 | B1* | 11/2019 | Brailovskiy | H04N 13/246 |
| 10,928,904 | B1* | 2/2021 | Novelli | G06K 9/00597 |
| 2009/0304289 | A1* | 12/2009 | Karimoto | H04N 5/23219 |
| | | | | 382/224 |

(Continued)

FOREIGN PATENT DOCUMENTS

| | | | | |
|---|---|---|---|---|
| EP | 3572910 A1 * | 11/2019 | | G06F 3/038 |
| WO | WO-2019089014 A1 * | 5/2019 | | G06K 9/00369 |

OTHER PUBLICATIONS

Moving Face Spoofing Detection via 3D Projective Invariants (Year: 2012).*
A System for Monitoring the Engagement of Remote Online Students Using Eye Gaze Estimation (Year: 2014).*
An Orientation Sensor-Based Head Tracking System for Driver Behaviour Monitoring (Year: 2017).*

(Continued)

*Primary Examiner* — Nizar N Sivji
(74) *Attorney, Agent, or Firm* — Lindauer Law, PLLC

(57) ABSTRACT

An autonomous mobile device (AMD) or other device may perform various tasks during operation. The AMD includes a camera to acquire an image. Some tasks, such as presenting information on a display screen or a video call, may involve the AMD determining whether a user is engaged with the AMD. The AMD may move a component, such as the camera or the display screen, to provide a best experience for an engaged user. Images from the camera are processed to determine attributes of the user, such as yaw of the face of the user, pitch of the face of the user, distance from the camera, and so forth. Based on the values of these attributes, a user engagement score is determined. The score may be used to select a particular user from many users in the image, or to otherwise facilitate operation of the AMD.

20 Claims, 6 Drawing Sheets

(56) References Cited

U.S. PATENT DOCUMENTS

| | | | |
|---|---|---|---|
| 2014/0340531 A1* | 11/2014 | Jain | G06K 9/00308 |
| | | | 348/207.1 |
| 2015/0098633 A1* | 4/2015 | Kato | G06K 9/00845 |
| | | | 382/118 |
| 2015/0378433 A1* | 12/2015 | Savastinuk | G06F 21/32 |
| | | | 345/156 |
| 2017/0169287 A1* | 6/2017 | Tokunaga | G06K 9/00912 |
| 2019/0037125 A1* | 1/2019 | Jiang | G03B 15/03 |
| 2019/0080155 A1* | 3/2019 | Ganong | G06K 9/00261 |
| 2019/0108735 A1* | 4/2019 | Xu | G08B 13/19695 |
| 2019/0313058 A1* | 10/2019 | Harrison | H04N 21/44008 |
| 2019/0347813 A1* | 11/2019 | Gernoth | G01B 11/14 |
| 2019/0370529 A1* | 12/2019 | Kumar | G06K 9/00275 |
| 2020/0151502 A1* | 5/2020 | Huang | G06K 9/00228 |

OTHER PUBLICATIONS

Assessing Visual Exploratory Activity of Athletes in Virtual Reality Using Head Motion Characteristics (Year: 2021).*

Computer Vision Tools for Low-Cost and Noninvasive Measurement of Autism-Related Behaviors in Infants (Year: 2013).*

Driver Distraction Using Visual-Based Sensors and Algorithms (Year: 2016).*

Head-Pose-Based Attention Recognition on Large Public Displays (Year: 2014).*

Learning Accurate Head Pose for Consumer Technology From 3D Synthetic Data (Year: 2021).*

Baltrusaitis, et al., "OpenFace 2.0 Facial Behavior Analysis Toolkit", Microsoft Cambridge, UK, & Carnegie Mellon University, Pittsburgh, USA, IEEE, 2018, 8 pgs. Retrieved from the Internet: https://par.nsf.gov/servlets/purl/10099458.

* cited by examiner

| USER ID 602 | ATTRIBUTE(S) 604 | | | | | | USER ENGAGEMENT SCORE 146 |
|---|---|---|---|---|---|---|---|
| | MOUTH OPEN (0-1) 606 | EYES OPEN (0-2) 608 | FACE YAW DATA (DEGREES) 610 | FACE PITCH DATA (DEGREES) 612 | DISTANCE DATA (METERS) 126 | SPEECH DETECTED (AUDIO) 614 | |
| 104(1) | 0 | 2 | 2 | 5 | 1.5 | 5 | 0.878 |
| 104(2) | 0 | 2 | 37 | 3 | 2.3 | 3 | 0.530 |
| ... | .. | .. | .. | ... | ... | ... | ... |

FIG. 6

SYSTEM TO DETERMINE USER ENGAGEMENT WITH AUTONOMOUS MOBILE DEVICE

BACKGROUND

Every day a user encounters a variety of tasks both personal and work related that need to be attended to. These may include helping in the care of others such as children or the elderly, taking care of a home, staying in contact with others, and so forth. Devices that assist in these tasks may help the user perform the tasks better, may free up the user to do other things, and so forth.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

FIG. 6 illustrates attributes that may be used to determine the user engagement score, according to some implementations.

Figure 1:
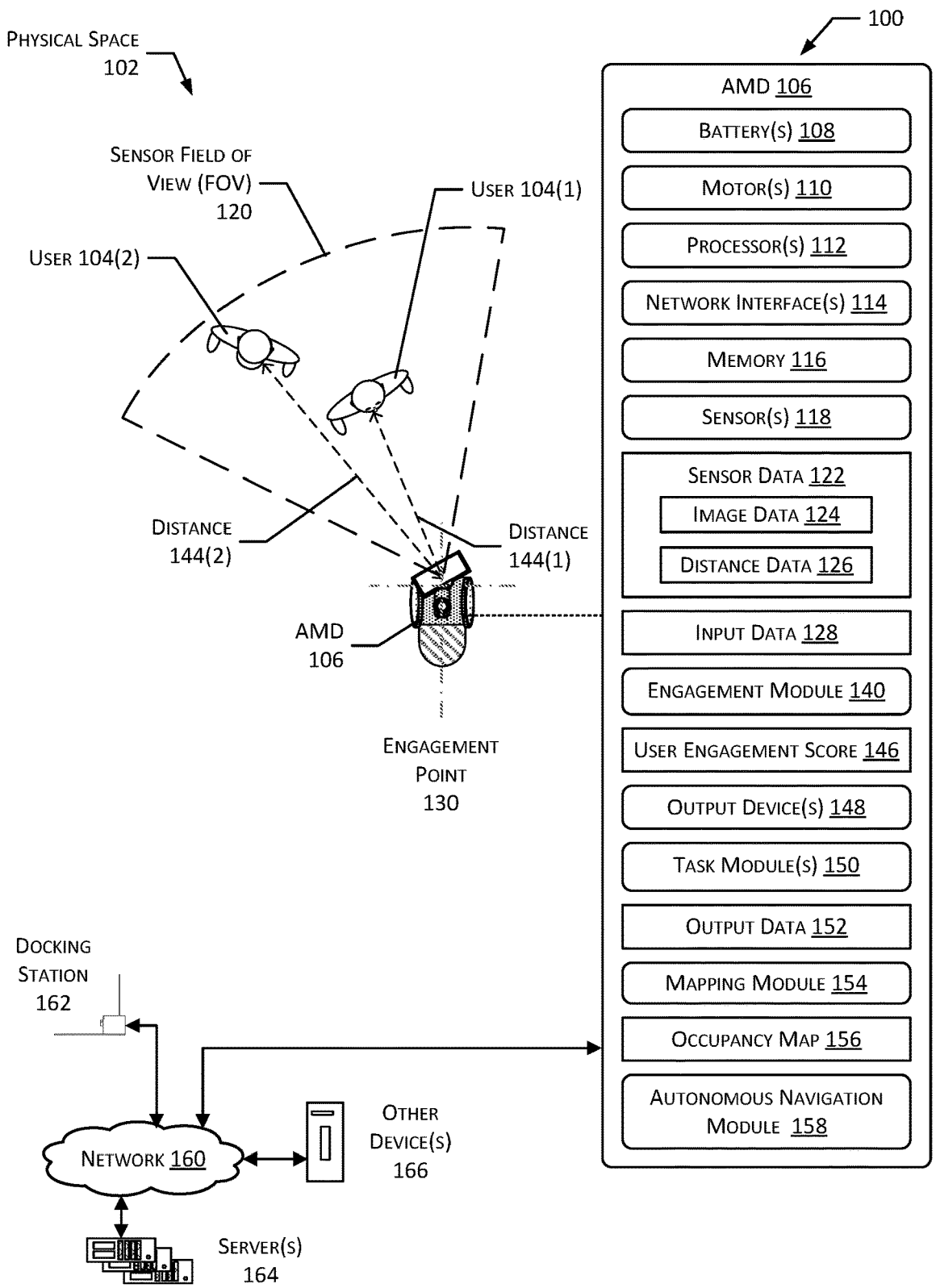
FIG. 1 illustrates a system that includes an autonomous mobile device (AMD) that determines a user engagement score indicative of user engagement with the AMD, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

A device such as an autonomous mobile device (AMD), countertop device, and so forth may perform tasks that involve moving within the physical space. These tasks may include interaction with one or more users. For example, the device may be used to present video content to the user with a display, present audio content using speakers, and so forth. However, at different times the user may experience different levels of engagement with the device. For example, the user may turn their face towards the display to participate in a video call facilitated by the device. By the user facing the display, the user may be deemed to be highly engaged. In comparison, if the user turns their face away, they may be deemed to be minimally engaged.

Described in this disclosure are techniques and systems to determine a user engagement score that is indicative of how engaged the user is with the device. In one implementation, image data is acquired using a camera associated with the device. The image data is processed to determine values of one or more attributes about a face of the user that is depicted in that image data. For example, the attributes may include the apparent yaw and pitch of the face of the user relative to the camera. In one implementation, one or more neural networks or classifiers may be used to determine the attributes. The attributes may also include a distance between the user and the device. For example, a stereocamera or optical time of flight sensor may be used to determine a distance between the device and the user associated with the face.

The values of the one or more attributes are provided as inputs to determine a user engagement score that is indicative of the engagement of the user with respect to the device. For example, first image data depicting the user directly facing the camera and first distance data of a first distance of 30 centimeters (cm) may result in a first user engagement score of "1.0", while second image data depicting only the side of the user's face and second distance data of a second distance of 2.5 meters (m) may result in a second user engagement score of "0.1". In one implementation, the determination of the user engagement score may utilize a multi-dimensional Gaussian function, with a particular attribute associated with a given dimension.

The determination of some values may be associated with at least one confidence value. The confidence value may be indicative of a likelihood that the value is correct. For example, a neural network that determines face yaw and face pitch may also produce as output a confidence value associated with one or more of the face yaw or the face pitch. In some implementations the determination of the user engagement score may be based on one or more confidence values. For example, the confidence value associated with the face yaw value may be used such that a decrease in confidence value would decrease the relative contribution of the face yaw value to the overall user engagement score.

The confidence value may also be used to disregard data deemed unsuitable for determining a user engagement score. For example, the determination of the user engagement score may be responsive to the confidence value exceeding a threshold value.

Once determined, the user engagement score may be used to operate the device. In some implementations, at least a portion of the device may be able to move. For example, the AMD may be a robot that is capable of autonomous movement, allowing it to move from one location in a physical space to another without being "driven" or remotely controlled by a user. In another example, a portion of the device may be able to move. Continuing the example, the display screen may be able to be panned, tilted, and so forth. During performance of a task, it may be advantageous to move the device, or the portion thereof, to maintain a particular orientation with respect to the user. For example, a display may be panned to track a user, allowing the user to more easily see output presented on the display.

The user engagement score may be used to determine which user, from a plurality of users, should be tracked. For example, during a video call, the device may pan and track the user having the greatest user engagement score. This allows the device to provide improved performance to the engaged user in the situation where other users are visible but not engaged in the video call. The determination of user engagement scores and their comparison in situations where multiple users are visible in the image data is computationally efficient and highly accurate. As a result, computational processing requirements are relatively low, allowing the user engagement score to be determined on a relatively low cost device.

The user engagement score may also be used to control output. In one implementation, if the user engagement score drops below a threshold value, presentation of content on the display, speakers, or both may be suspended. For example, as the user turns away from the device to talk with someone else, their user engagement score drops below the threshold value. Responsive to this, the presentation of video content on the display is paused. Once the user turns back toward the device, the user engagement score rises above the threshold value, and presentation resumes. This may help reduce the incidence of the user missing at least a part of the content due to distraction. As a result, user comprehension and overall experience while using the device is substantially improved.

Illustrative System

FIG. 1 illustrates a system 100 in which a physical space 102 includes one or more users 104 and an autonomous mobile device (AMD) 106 or other device, according to some implementations. Each user 104 may be associated with a user location relative to the AMD 106.

The AMD 106 may include a battery(s) 108 to provide electrical power for operation of the AMD 106. The battery 108 may be rechargeable, allowing it to store electrical energy obtained from an external source. In other implementations a wireless power receiver may be used to provide power for operation of the AMD 106, recharge the battery 108, and so forth.

One or more motors 110 or other actuators enable the AMD 106 to move from one location in the physical space 102 to another. For example, a motor 110 may be used to drive a wheel attached to a chassis of the AMD 106, which causes the AMD 106 to move. The AMD 106 may turn, move forward, move backward, and so forth. In another example, a motor 110 may move a portion of the AMD 106, such as panning or tilt a display, camera, speakers, and so forth.

The AMD 106 may include one or more hardware processors 112 (processors) configured to execute one or more stored instructions. The processors 112 may comprise one or more cores. The processors 112 may include microcontrollers, systems on a chip, field programmable gate arrays, digital signal processors, graphic processing units, general processing units, and so forth.

The AMD 106 may include one or more network interfaces 114. The network interfaces 114 may include devices to connect to personal area networks (PANs), local area networks (LANs), wireless local area networks (WLANS), wide area networks (WANs), and so forth. For example, the network interfaces 114 may include devices compatible with Ethernet, Wi-Fi, Bluetooth, Bluetooth Low Energy, ZigBee, and so forth.

The AMD 106 includes one or more memories 116. The memory 116 may comprise one or more non-transitory computer-readable storage media (CRSM).

The AMD 106 may include one or more sensors 118. For example, the sensors 118 may include one or more of a camera, microphone array, distance sensor, and so forth. Individual sensors 118, such as a camera, may exhibit a sensor field of view (FOV) 120. For example, the sensor FOV 120 of a camera may be indicative of the portion of the physical space 102 that the camera is able to acquire an image of. The sensors 118 may generate sensor data 122. The sensor data 122 may include image data 124 acquired by the camera, distance data 126 acquired by a distance sensor, and so forth. The sensors 118 are discussed in more detail with regard to FIG. 3.

During operation the AMD 106 may determine input data 128. The input data 128 may include or be based at least in part on sensor data 122 from the sensors 118 onboard the AMD 106. In one implementation, a speech processing module may process raw audio data obtained by a microphone on the AMD 106 and produce input data 128. For example, the user 104 may say "place a video call" which may produce input data 128 indicative of this command. In another implementation, the input data 128 may comprise information such as a command provided by another computing device, such as a smartphone or tablet computer.

An engagement point 130 may be designated with respect to the AMD 106. The engagement point 130 may be the point at which the user 104 is expected to direct their attention while engaged. This attention may be expressed by the user 104 through facing the engagement point 130, orientating their entire body toward the engagement point 130, and so forth. The engagement point 130 may be specified with respect to one or more of the sensors 118, output devices 148, structure of the AMD 106 and so forth. For example, the AMD 106 may include a display with a camera mounted in a bezel of the display. The engagement point 130 may be defined as the point in the center of a plane of the display, as this is where the user 104 may be expected to look while engaged.

The AMD 106 may use an engagement module 140 to determine a user engagement score 146 that is indicative of a user's 104 apparent engagement with the AMD 106. During operation, the engagement module 140 may accept input sensor data 122, such as image data 124 acquired by the camera 344, distance data 126 acquired by a distance sensor, and so forth.

In one implementation the engagement module 140 may determine one or more values indicative of attributes associated with the user 104. Face yaw data is indicative of a relative yaw of the face of the user as depicted in the image data 124 relative to the camera. Face pitch data is indicative of a relative pitch of the face of the user as depicted in the image relative to the camera. Mouth open data is indicative of a mouth of the user depicted in the image being open or closed. Eyes open data is indicative of whether eyes of the user depicted in the image are open or closed. Some attributes are also discussed with regard to FIG. 6.

The engagement module 140 may include one or more artificial neural networks (ANN), classifiers, and so forth that accept as input the image data 124 or a portion thereof. The image data 124 may be processed with a face detection algorithm to determine a face of the user is depicted in the image data 124. For example, the face detection algorithm may utilize a Haar cascade face detector, a trained ANN, a histogram of gradients face detector, and so forth. A face bounding box may be determined that is indicative of a portion of the image that is determined to represent a face of the user.

The image data 124 may be further processed to determine one or more values indicative of attributes associated with the detected face of the user. For example, an ANN may process at least the portion of the image data 124 representative of the face of the user and determine values of attributes such as a face yaw value, face pitch value, and so forth. This is discussed in more detail with regard to FIG. 4. In another implementation, the engagement module 140 may receive the one or more values from other modules.

The distance data 126 is indicative of a distance 144 between the user 104 and a distance sensor. In some implementations the distance data 126 may be adjusted to compensate for a physical displacement or offset between the distance sensor and the engagement point 130. The distance data 126 may be determined using one or more distance sensors, such as a pair of cameras 344 operating as a stereocamera, ultrasonic sensor 318, optical sensor 320, lidar 322, radar 360, and so forth. In other implementations the distance data 126 may be determined based on the image data 124. For example, a relative size of the face bounding box in pixels may be used to approximate a distance 144 between the user 104 and the AMD 106.

In some implementations, the engagement module 140 may utilize Equations 1-4 or variations thereof to calculate the user engagement score 146 using the values of the one or more attributes. These variations may include any permutation for the factors in the exponent of Equation 1, such as including or omitting one or more of the factors B, C, D, E, F, or G. For example, a first implementation of Equation 1 may consist of factors B, C, and D. In another example, a second implementation of Equation 1 may consist of factors C and F.

In some implementations, one or more of the values of the attributes may be determined using a neural network $$\text{User Engagement Score} = A * e^{-(B+C+D+E+F+G)} \quad \text{(Equation 1)}$$

where A is a constant, e.g. 1.0, and factor B is described in Equation 2, factor C is described in Equation 3, and factor D is described in Equation 4.

$$B = \frac{(x_y - \mu_y)^2}{2\sigma_y^2} \quad \text{(Equation 2)}$$

where:
$x_y$ is face yaw value (in degrees), such as determined by a neural network
$\mu_y$ is a mean face yaw value (in degrees), e.g. 0.0
$\sigma_y$ is a standard deviation for face yaw value, e.g. 45.0

$$C = \frac{(x_p - \mu_p)^2}{2\sigma_p^2} \quad \text{(Equation 3)}$$

where:
$x_p$ is face pitch value (in degrees)
$\mu_p$ is a mean face pitch value (in degrees), e.g. 60.0
$\sigma_p$ is a standard deviation for face pitch value $$D = \frac{(x_d - \mu_d)^2}{2\sigma_d^2} \quad \text{(Equation 4)}$$

where:
$x_d$ is distance 144 to the face of the user
$\mu_d$ is a mean distance, e.g. 1 meter
$\sigma_p$ is a standard deviation distance, e.g. 3.0

The mean values, such as $\mu_y$, $\mu_p$, and $\mu_d$, may be determined empirically. For example, during testing the mean values may be determined that are deemed to be associated with user engagement. In some implementations, the mean values may be set based on an offset between the location in space of the camera relative to the device or object for which the user engagement score 146 is to be associated. For example, for a user engagement score 146 associated with the display, the mean values of $\mu_y$ and $\mu_p$ may include the values that correspond to the user 104 looking at a display at a first physical location that is offset relative to the camera located in a second location in physical space that is acquiring the image data 124.

In some implementations, instead of or in addition to determining the distance 144, a value of E may be determined based on one or more image metrics of a portion of the image. The value of E may be used in Equation 1 as indicated above. For example, instead of the distance 144 to the face of the user, information about a face bounding box 402 may be used. The image metrics may comprise one or more of height of the first portion as measured in pixels, width of the first portion as measured in pixels, area of the first portion as measured in pixels, and so forth.

In some implementations, the factors used by Equation 1 may be based on data from other sensors 118 may be used as in other implementations. The value of F may be used in Equation 1 as indicated above, where F is indicative of a correspondence between the direction of the user 104 depicted in the image data 124 and a direction from which the sound of speech is detected. A first direction may be determined that is indicative of the direction of the face of the user 104 depicted in the image data 124 relative to the AMD 106. Given a known relative physical arrangement of the camera with respect to the microphone array, the position of the face of the user in the image data 124 may be associated with a direction relative to the camera and thus the AMD 106.

A second direction may be determined indicative of a sound. Audio data may be acquired by an array of microphones at a time corresponding to the image data 124. The audio data may be processed with a speech detection algorithm to determine if speech sounds are present. The microphone array may use one or more beamforming or other processing techniques to determine a second direction, relative to the AMD 106, that is associated with the sound of speech.

The first direction and the second direction are compared. If the second direction is within a threshold value of the first direction, the value of F may be set to a first predetermined value, such as "+1". If not, the sound direction is not within a threshold value of the first direction and the value of F may be set to a second predetermined value, such as "−1". For example, the first direction may be indicative of a direction of "47 degrees", the second direction may be indicative of a direction range of "20 to 90 degrees" and the threshold value may be 20 degrees. Continuing the example, 47 degrees is within 20 degrees of the range of 20-90 degrees, and so the value of F would be "+1".

The value of G may be used in Equation 1 as indicated above, where G is indicative of a confidence value of one or more of the attributes. The confidence value may be indicative of a likelihood that a value of one or more attributes is correct. For example, G may comprise a confidence value provided by the neural network that determines both the face yaw 406 and face pitch 408. In another implementation, additional factors may be used that are indicative of confidence values associated with the one or more factors used in the exponent of Equation 1. For example, confidence value G1 may be a confidence value of the determination of face yaw 406, G2 may be a confidence value of the determination of the face pitch 408, G3 may be a confidence value of the determination of the distance D, and so forth. The resulting variation of the user engagement score may be calculated as shown in Equation 5.

$$\text{User Engagement Score} = A * e^{-((B*G1)+(C*G2)+(D*G3)+(E*G4)+(F*G4))} \quad \text{(Equation 5)}$$

The AMD 106 includes one or more output devices 148, such as one or more of a motor 110, light, speaker, display, projector, printer, and so forth. The one or more output devices 148 may be used to provide output during operation of the AMD 106. The output devices 148 are discussed in more detail with regard to FIG. 3.

The AMD 106 may utilize one or more task modules 150 to perform a task. The task module 150 comprises instructions that, when executed, provide one or more functions. The task modules 150 may perform functions such as following a user 104, presenting output on output devices 148 of the AMD 106, performing sentry tasks by moving the AMD 106 through the physical space 102, and so forth. Some tasks may be enabled or otherwise facilitated using the user engagement score 146. For example, the user 104 associated with the greatest user engagement score 146 may be selected for tracking during a video call or while presenting content using the output devices 148.

The mapping module 154 determines an occupancy map 156 that represents the physical space 102 and obstacles and their locations in the physical space 102. During operation the mapping module 154 uses the sensor data 122 from various sensors 118 to determine information such as where the AMD 106 is, the presence of obstacles, where those obstacles are, how far the AMD 106 has moved, and so forth.

The occupancy map 156 may comprise data that indicates the location of one or more obstacles, such as a table, wall, stairwell, and so forth. In some implementations, the occupancy map 156 may comprise a plurality of cells with each cell of the plurality of cells representing a particular area in the physical space 102. Data, such as occupancy values, may be stored that indicates whether an area of the physical space 102 associated with the cell is unobserved, occupied by an obstacle, or is unoccupied. An obstacle may comprise an object or feature that prevents or impairs traversal by the AMD 106. For example, an obstacle may comprise a wall, stairwell, and so forth.

The occupancy map 156 may be manually or automatically determined. For example, during a learning phase the user 104 may take the AMD 106 on a tour of the physical space 102, allowing the mapping module 154 of the AMD 106 to determine the occupancy map 156. The user 104 may provide input data 128 such as tags designating a particular obstacle type, such as "furniture" or "fragile". In another example, during subsequent operation, the AMD 106 may generate the occupancy map 156 that is indicative of locations and types of obstacles such as chairs, doors, stairwells, and so forth as it moves unattended through the physical space 102.

Modules described herein, such as the engagement module 140, the mapping module 154, or other modules may provide various processing functions such as de-noising, filtering, and so forth. Processing of sensor data 122, such as image data 124 from a camera, may be performed by a module implementing, at least in part, one or more of the following tools or techniques. In one implementation, processing of an image may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 122. In still another implementation, functions such as those in the Machine Vision Toolbox (MVTB) available using MATLAB as developed by Math Works, Inc. of Natick, Mass., USA, may be utilized.

Techniques such as artificial neural networks (ANNs), convolutional neural networks (CNNs), active appearance models (AAMs), active shape models (ASMs), principal component analysis (PCA), cascade classifiers, and so forth, may also be used to process the sensor data 122 or other data. For example, the ANN may be trained using a supervised learning algorithm such that object identifiers are associated with images of particular objects within training images provided to the ANN. Once trained, the ANN may be provided with the sensor data 122 and produce output indicative of the object identifier. In another example, the ANN may be trained to provide face yaw data, face pitch data, and so forth.

An autonomous navigation module 158 provides the AMD 106 with the ability to navigate within the physical space 102 without real-time human interaction. The autonomous navigation module 158 may implement, or operate in conjunction with, the mapping module 154 to determine the occupancy map 156. The autonomous navigation module 158 is discussed in more detail with regard to FIG. 2.

The AMD 106 autonomous navigation module 158 may generate path plan data that is indicative of a path through the physical space 102 from the current location to a destination location. The AMD 106 may then begin moving along the path.

The AMD 106 may use the network interfaces 114 to connect to a network 160. For example, the network 160 may comprise a wireless local area network, that is connected to a wide area network such as the Internet.

The AMD 106 may be configured to dock or connect to a docking station 162. The docking station 162 may also be connected to the network 160. For example, the docking station 162 may be configured to connect to the wireless local area network 160 such that the docking station 162 and the AMD 106 may communicate. The docking station 162 may provide external power which the AMD 106 may use to charge the battery 108.

The AMD 106 may access one or more servers 164 via the network 160. For example, the AMD 106 may utilize a wakeword detection module to determine if the user 104 is addressing a request to the AMD 106. The wakeword detection module may hear a specified word or phrase and transition the AMD 106 or portion thereof to the wake operating mode. Once in the wake operating mode, the AMD 106 may then transfer at least a portion of the audio spoken by the user 104 to one or more servers 164 for further processing. The servers 164 may process the spoken audio and return to the AMD 106 data that may be subsequently used to operate the AMD 106.

The AMD 106 may also communicate with other devices 166. The other devices 166 may include controlled devices, or other devices. For example, the other devices 166 may include a doorbell camera, a garage door opener, a refrigerator, washing machine, and so forth. In some implementations the other devices 166 may include other AMDs 106, vehicles, and so forth.

In other implementations, other types of autonomous mobile devices (AMD) may use the systems and techniques described herein. For example, the AMD 106 may comprise an autonomous ground vehicle that is moving on a street, an autonomous aerial vehicle in the air, autonomous marine vehicle, and so forth.

Figure 2:
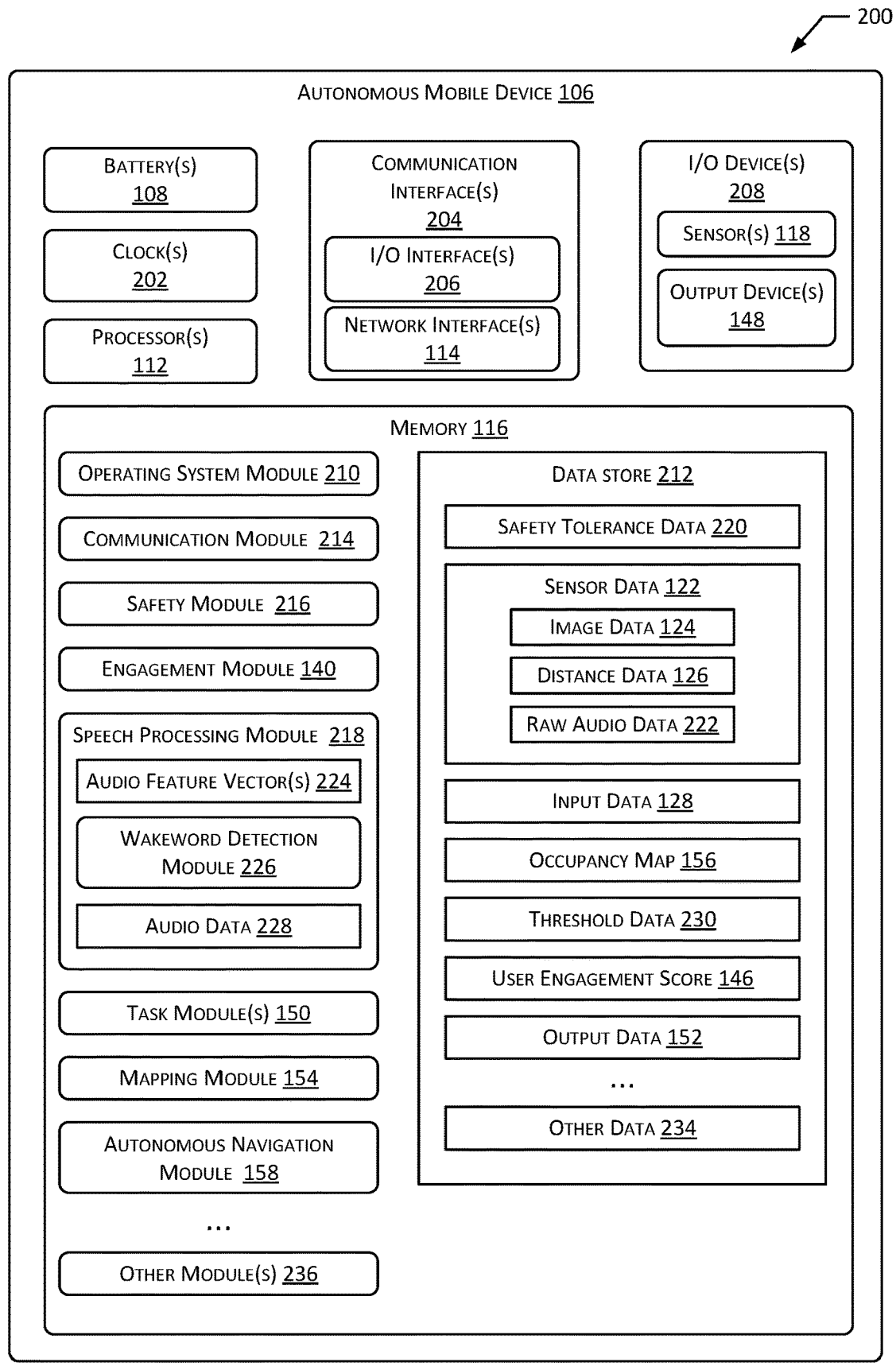
FIG. 2 is a block diagram of the components of the AMD, according to some implementations.

FIG. 2 is a block diagram 200 of the components of the AMD 106, according to some implementations. The AMD 106 may include one or more batteries 108 to provide electrical power suitable for operating the components in the AMD 106. In some implementations other devices may be used to provide electrical power to the AMD 106. For example, power may be provided by wireless power transfer, capacitors, fuel cells, storage flywheels, and so forth.

One or more clocks 202 may provide information indicative of date, time, ticks, and so forth. For example, the processor 112 may use data from the clock 202 to associate a particular time with an action, sensor data 122, and so forth.

The AMD 106 may include one or more hardware processors 112 (processors) configured to execute one or more stored instructions. The processors 112 may comprise one or more cores. The processors 112 may include microcontrollers, systems on a chip, field programmable gate arrays, digital signal processors, graphic processing units, general processing units, and so forth.

The AMD 106 may include one or more communication interfaces 204 such as input/output (I/O) interfaces 206, network interfaces 114, and so forth. The communication interfaces 204 enable the AMD 106, or components thereof, to communicate with other devices 166 or components. The communication interfaces 204 may include one or more I/O interfaces 206. The I/O interfaces 206 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 206 may couple to one or more I/O devices 208. The I/O devices 208 may include input devices such as one or more of a sensor 118, keyboard, mouse, scanner, and so forth. The I/O devices 208 may also include output devices 148 such as one or more of a motor 110, light, speaker, display, projector, printer, and so forth. In some embodiments, the I/O devices 208 may be physically incorporated with the AMD 106 or may be externally placed.

The network interfaces 114 may be configured to provide communications between the AMD 106 and other devices 166 such as other AMDs 106, docking stations 162, routers, access points, and so forth. The network interfaces 114 may include devices configured to couple to personal area networks (PANs), local area networks (LANs), wireless local area networks (WLANS), wide area networks (WANs), and so forth. For example, the network interfaces 114 may include devices compatible with Ethernet, Wi-Fi, Bluetooth, Bluetooth Low Energy, ZigBee, and so forth. The AMD 106 may also include one or more busses or other internal communications hardware or software that allow for the transfer of data between the various modules and components of the AMD 106.

As shown in FIG. 2, the AMD 106 includes one or more memories 116. The memory 116 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 116 provides storage of computer-readable instructions, data structures, program modules, and other data for the operation of the AMD 106. A few example functional modules are shown stored in the memory 116, although the same functionality may alternatively be implemented in hardware, firmware, or as a system on a chip (SoC).

The memory 116 may include at least one operating system (OS) module 210. The OS module 210 is configured to manage hardware resource devices such as the I/O interfaces 206, the I/O devices 208, the communication interfaces 204, and provide various services to applications or modules executing on the processors 112. The OS module 210 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; the AMD Operating System (ROS) as promulgated at www.ros.org, and so forth.

Also stored in the memory 116 may be a data store 212 and one or more of the following modules. These modules may be executed as foreground applications, background tasks, daemons, and so forth. The data store 212 may use a flat file, database, linked list, tree, executable code, script, or other data structure to store information. In some implementations, the data store 212 or a portion of the data store 212 may be distributed across one or more other devices 166 including other AMDs 106, servers 164, network attached storage devices, and so forth.

A communication module 214 may be configured to establish communication with other devices 166, such as other AMDs 106, an external server 164, a docking station 162, and so forth. The communications may be authenticated, encrypted, and so forth.

Other modules within the memory 116 may include a safety module 216, the engagement module 140, the mapping module 154, the autonomous navigation module 158, the one or more task modules 150, a speech processing module 218, or other modules 236. The modules may access data stored within the data store 212, including safety tolerance data 220, sensor data 122, threshold data 230, other data 234, and so forth.

The safety module 216 may access the safety tolerance data 220 to determine within what tolerances the AMD 106 may operate safely within the physical space 102. For example, the safety module 216 may be configured to stop the AMD 106 from moving when an extensible mast of the AMD 106 is extended. In another example, the safety tolerance data 220 may specify a minimum sound threshold which, when exceeded, stops all movement of the AMD 106. Continuing this example, detection of sound such as a human yell would stop the AMD 106. In another example, the safety module 216 may access safety tolerance data 220 that specifies a minimum distance from an object that the AMD 106 is to maintain. Continuing this example, when a sensor 118 detects an object has approached to less than the minimum distance, all movement of the AMD 106 may be stopped. Movement of the AMD 106 may be stopped by one or more of inhibiting operations of one or more of the motors 110, issuing a command to stop motor operation, disconnecting power from one or more the motors 110, and so forth. The safety module 216 may be implemented as hardware, software, or a combination thereof.

The safety module 216 may control other factors, such as a maximum speed of the AMD 106 based on information obtained by the sensors 118, precision and accuracy of the sensor data 122, and so forth. For example, detection of an object by an optical sensor may include some error, such as when the distance to an object comprises a weighted average between an object and a background. As a result, the maximum speed permitted by the safety module 216 may be based on one or more factors such as the weight of the AMD 106, nature of the floor, distance to the object, and so forth. In the event that the maximum permissible speed differs from the maximum speed permitted by the safety module 216, the lesser speed may be utilized.

As described above, the engagement module 140 may generate the user engagement score 146. For example, the engagement module 140 may use the image data 124 and the distance data 126 to determine the user engagement score 146.

The speech processing module 218 may be used to process utterances of the user 104. Microphones may acquire audio in the presence of the AMD 106 and may send raw audio data 222 to an acoustic front end (AFE). The AFE may transform the raw audio data 222 (for example, a single-channel, 16-bit audio stream sampled at 16 kHz), captured by the microphone, into audio feature vectors 224 that may ultimately be used for processing by various components, such as a wakeword detection module 226, speech recognition engine, or other components. The AFE may reduce noise in the raw audio data 222. The AFE may also perform acoustic echo cancellation (AEC) or other operations to account for output audio data that may be sent to a speaker of the AMD 106 for output. For example, the AMD 106 may be playing music or other audio that is being received from a network 160 in the form of output audio data. To prevent the output audio from interfering with the device's ability to detect and process input audio, the AFE or other component may perform echo cancellation to remove the output audio data from the input raw audio data 222, or other operations.

The AFE may divide the raw audio data 222 into frames representing time intervals for which the AFE determines a number of values (i.e., features) representing qualities of the raw audio data 222, along with a set of those values (i.e., a feature vector or audio feature vector 224) representing features/qualities of the raw audio data 222 within each frame. A frame may be a certain period of time, for example a sliding window of 25 ms of audio data 228 taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 222, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 224 (or the raw audio data 222) may be input into a wakeword detection module 226 that is configured to detect keywords spoken in the audio. The wakeword detection module 226 may use various techniques to determine whether audio data 228 includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the AMD 106 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the AMD 106 (or separately from speech detection), the AMD 106 may use the wakeword detection module 226 to perform wakeword detection to determine when a user intends to speak a command to the AMD 106. This process may also be referred to as keyword detection, with the wakeword being a specific example of a keyword. Specifically, keyword detection is typically performed without performing linguistic analysis, textual analysis, or semantic analysis. Instead, incoming audio is analyzed to determine if specific characteristics of the audio match preconfigured acoustic waveforms, audio signatures, or other data to determine if the incoming audio "matches" stored audio data corresponding to a keyword.

Thus, the wakeword detection module 226 may compare audio data 228 to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN, or using RNN. Following on, posterior threshold tuning or smoothing is applied for decision making. Other techniques for wakeword detection, such as those known in the art, may also be used.

Once the wakeword is detected, circuitry or applications of the local AMD 106 may "wake" and begin transmitting audio data 228 (which may include one or more of the raw audio data 222 or the audio feature vectors 224) to one or more server(s) 164 for speech processing. The audio data 228 corresponding to audio obtained by the microphone may be processed locally on one or more of the processors 112, sent to a server 164 for routing to a recipient device or may be sent to the server 164 for speech processing for interpretation of the included speech (either for purposes of enabling voice-communications and/or for purposes of executing a command in the speech). The audio data 228 may include data corresponding to the wakeword, or the portion of the audio data 228 corresponding to the wakeword may be removed by the AMD 106 prior to sending to the server 164, and so forth.

The speech processing module 218 may include or access an automated speech recognition (ASR) module. The ASR module may accept as input raw audio data 222 or audio feature vectors 224 and may produce as output the input data 128 comprising a text string or other data representation. The input data 128 comprising the text string or other data representation may be processed to determine the command to be executed. For example, the utterance of the command "robot, come here" may result in input data 128 comprising the text string "come here". The wakeword "robot" may be omitted from the input data 128.

The autonomous navigation module 158 provides the AMD 106 with the ability to navigate within the physical space 102 without real-time human interaction. The autonomous navigation module 158 may implement, or operate in conjunction with, the mapping module 154 to determine the occupancy map 156, or other representation of the physical space 102. In one implementation, the mapping module 154 may use one or more simultaneous localization and mapping ("SLAM") techniques. The SLAM algorithms may utilize one or more of maps, algorithms, beacons, or other techniques to navigate. The autonomous navigation module 158 may use the occupancy map 156 to determine a set of possible paths along which the AMD 106 may move. One of these may be selected and used to determine path plan data indicative of a path. For example, a possible path that is the shortest or has the fewest turns may be selected and used to determine the path. The path is then subsequently used to determine a set of commands that drive the motors 110 connected to the wheels. For example, the autonomous navigation module 158 may determine the current location within the physical space 102 and determine a path plan that describes the path to a destination location such as the docking station 162.

The autonomous navigation module 158 may utilize various techniques during processing of sensor data 122. For example, image data 124 comprising data obtained from one or more cameras on the AMD 106 may be processed to determine one or more of corners, edges, planes, and so forth. In some implementations, corners may be detected and the coordinates of those corners may be used to produce point cloud data. This point cloud data may then be used for SLAM or other purposes associated with mapping, navigation, and so forth.

The AMD 106 may move responsive to a determination made by an onboard processor 112, in response to a command received from one or more communication interfaces 204, as determined from the sensor data 122, and so forth. For example, an external server 164 may send a command that is received using the network interface 114. This command may direct the AMD 106 to proceed to find a particular user 104, follow a particular user 104, and so forth. The AMD 106 may then process this command and use the autonomous navigation module 158 to determine the directions and distances associated with carrying out the command. For example, the command to "come here" may result in a task module 150 sending a command to the autonomous navigation module 158 to move the AMD 106 to a particular location near the user 104 and orient the AMD 106 in a particular direction.

The AMD 106 may connect to the network 160 using one or more of the network interfaces 114. In some implementations, one or more of the modules or other functions described here may execute on the processors 112 of the AMD 106, on the server 164, or a combination thereof. For example, one or more servers 164 may provide various functions, such as ASR, natural language understanding (NLU), providing content such as audio or video to the AMD 106, and so forth.

The other modules 236 may provide other functionality, such as object recognition, speech synthesis, user authentication, and so forth. The other modules 236 may comprise a speech synthesis module that is able to convert text data to human speech. For example, the speech synthesis module may be used by the AMD 106 to provide speech that a user 104 is able to understand.

The data store 212 may store the other data 234 as well. For example, localization settings may indicate local preferences such as language, user identifier data may be stored that allows for identification of a particular user, and so forth.

Figure 3:
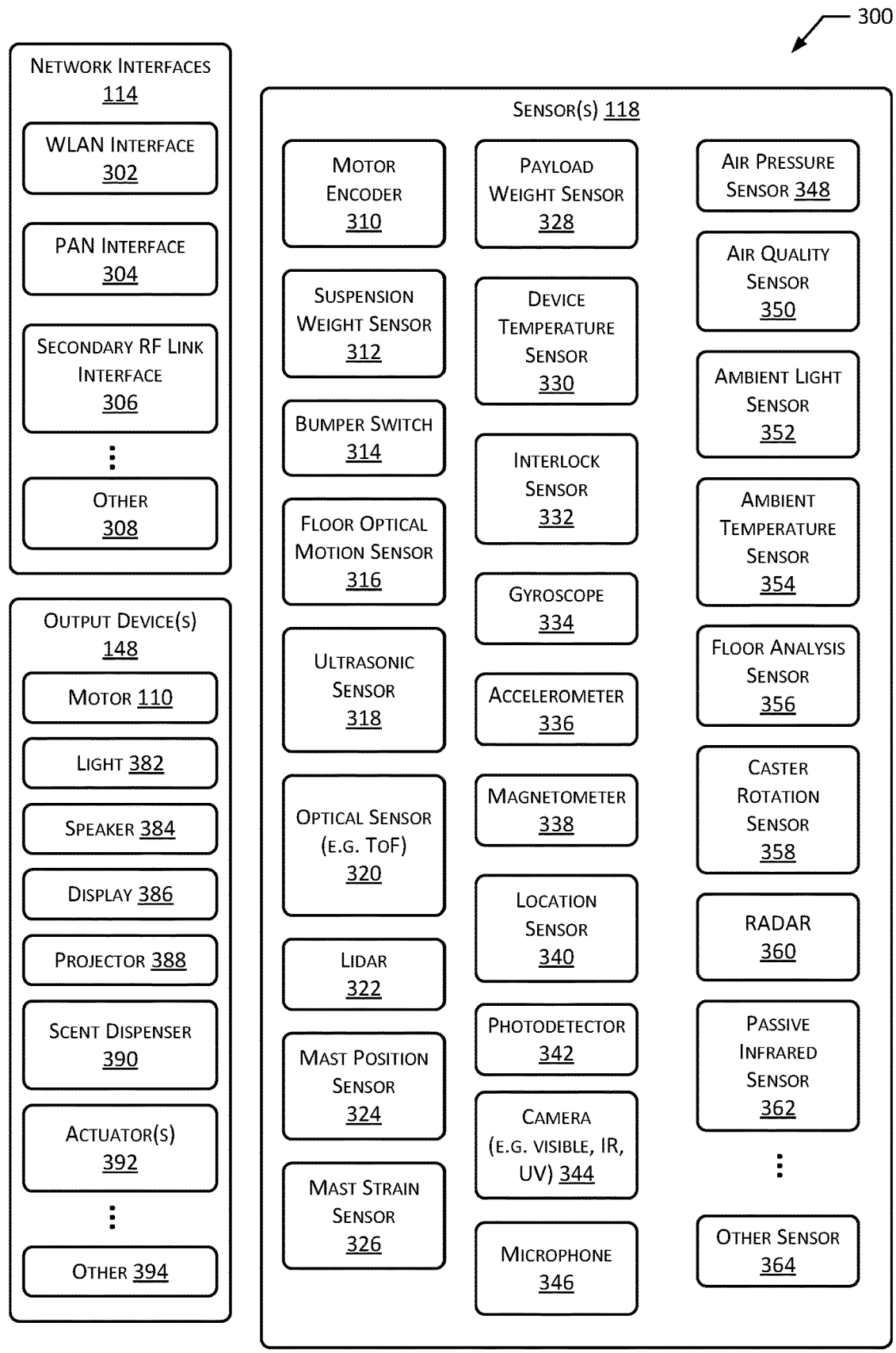
FIG. 3 is a block diagram of some components of the AMD, such as network interfaces, sensors, and output devices, according to some implementations.

FIG. 3 is a block diagram 300 of some components of the AMD 106 such as network interfaces 114, sensors 118, and output devices 148, according to some implementations. The components illustrated here are provided by way of illustration and not necessarily as a limitation. For example, the AMD 106 may utilize a subset of the particular network interfaces 114, output devices 148, or sensors 118 depicted here, or may utilize components not pictured. One or more of the sensors 118, output devices 148, or a combination thereof may be included on a moveable component that may be panned, tilted, rotated, or any combination thereof with respect to a chassis of the AMD 106.

The network interfaces 114 may include one or more of a WLAN interface 302, PAN interface 304, secondary radio frequency (RF) link interface 306, or other interface 308. The WLAN interface 302 may be compliant with at least a portion of the Wi-Fi specification. For example, the WLAN interface 302 may be compliant with at least a portion of the IEEE 802.11 specification as promulgated by the Institute of Electrical and Electronics Engineers (IEEE). The PAN interface 304 may be compliant with at least a portion of one or more of the Bluetooth, wireless USB, Z-Wave, ZigBee, or other standards. For example, the PAN interface 304 may be compliant with the Bluetooth Low Energy (BLE) specification.

The secondary RF link interface 306 may comprise a radio transmitter and receiver that operate at frequencies different from or using modulation different from the other interfaces. For example, the WLAN interface 302 may utilize frequencies in the 2.4 GHz and 5 GHz Industrial Scientific and Medicine (ISM) bands, while the PAN interface 304 may utilize the 2.4 GHz ISM bands. The secondary RF link interface 306 may comprise a radio transmitter that operates in the 900 MHz ISM band, within a licensed band at another frequency, and so forth. The secondary RF link interface 306 may be utilized to provide backup communication between the AMD 106 and other devices 166 in the event that communication fails using one or more of the WLAN interface 302 or the PAN interface 304. For example, in the event the AMD 106 travels to an area within the physical space 102 that does not have Wi-Fi coverage, the AMD 106 may use the secondary RF link interface 306 to communicate with another device such as a specialized access point, docking station 162, or other AMD 106.

The other 308 network interfaces may include other equipment to send or receive data using other wavelengths or phenomena. For example, the other 308 network interface may include an ultrasonic transceiver used to send data as ultrasonic sounds, a visible light system that communicates by modulating a visible light source such as a light-emitting diode, and so forth. In another example, the other 308 network interface may comprise a wireless wide area network (WWAN) interface or a wireless cellular data network interface. Continuing the example, the other 308 network interface may be compliant with at least a portion of the 3G, 4G, LTE, or other standards.

The AMD 106 may include one or more of the following sensors 118. The sensors 118 depicted here are provided by way of illustration and not necessarily as a limitation. It is understood that other sensors 118 may be included or utilized by the AMD 106, while some sensors 118 may be omitted in some configurations.

A motor encoder 310 provides information indicative of the rotation or linear extension of a motor 110. The motor 110 may comprise a rotary motor, or a linear actuator. In some implementations, the motor encoder 310 may comprise a separate assembly such as a photodiode and encoder wheel that is affixed to the motor 110. In other implementations, the motor encoder 310 may comprise circuitry configured to drive the motor 110. For example, the autonomous navigation module 158 may utilize the data from the motor encoder 310 to estimate a distance traveled.

A suspension weight sensor 312 provides information indicative of the weight of the AMD 106 on the suspension system for one or more of the wheels or the caster. For example, the suspension weight sensor 312 may comprise a switch, strain gauge, load cell, photodetector, or other sensing element that is used to determine whether weight is applied to a particular wheel, or whether weight has been removed from the wheel. In some implementations, the suspension weight sensor 312 may provide binary data such as a "1" value indicating that there is a weight applied to the wheel, while a "0" value indicates that there is no weight applied to the wheel. In other implementations, the suspension weight sensor 312 may provide an indication such as so many kilograms of force or newtons of force. The suspension weight sensor 312 may be affixed to one or more of the wheels or the caster. In some situations, the safety module 216 may use data from the suspension weight sensor 312 to determine whether or not to inhibit operation of one or more of the motors 110. For example, if the suspension weight sensor 312 indicates no weight on the suspension, the implication is that the AMD 106 is no longer resting on its wheels, and thus operation of the motors 110 may be inhibited. In another example, if the suspension weight sensor 312 indicates weight that exceeds a threshold value, the implication is that something heavy is resting on the AMD 106 and thus operation of the motors 110 may be inhibited.

One or more bumper switches 314 provide an indication of physical contact between a bumper or other member that is in mechanical contact with the bumper switch 314. The safety module 216 utilizes sensor data 122 obtained by the bumper switches 314 to modify the operation of the AMD 106. For example, if the bumper switch 314 associated with a front of the AMD 106 is triggered, the safety module 216 may drive the AMD 106 backwards.

A floor optical motion sensor (FOMS) 316 provides information indicative of motions of the AMD 106 relative to the floor or other surface underneath the AMD 106. In one implementation, the FOMS 316 may comprise a light source such as light-emitting diode (LED), an array of photodiodes, and so forth. In some implementations, the FOMS 316 may utilize an optoelectronic sensor, such as a low-resolution two-dimensional array of photodiodes. Several techniques may be used to determine changes in the data obtained by the photodiodes and translate this into data indicative of a direction of movement, velocity, acceleration, and so forth. In some implementations, the FOMS 316 may provide other information, such as data indicative of a pattern present on the floor, composition of the floor, color of the floor, and so forth. For example, the FOMS 316 may utilize an optoelectronic sensor that may detect different colors or shades of gray, and this data may be used to generate floor characterization data. The floor characterization data may be used for navigation.

An ultrasonic sensor 318 utilizes sounds in excess of 20 kHz to determine a distance from the sensor 118 to an object. The ultrasonic sensor 318 may comprise an emitter such as a piezoelectric transducer and a detector such as an ultrasonic microphone. The ultrasonic sensor 318 may be used to generate the distance data 126. The emitter may generate specifically timed pulses of ultrasonic sound while the detector listens for an echo of that sound being reflected from an object within the field of view. The ultrasonic sensor 318 may provide information indicative of a presence of an object, distance to the object, and so forth. Two or more ultrasonic sensors 318 may be utilized in conjunction with one another to determine a location within a two-dimensional plane of the object.

In some implementations, the ultrasonic sensor 318 or a portion thereof may be used to provide other functionality. For example, the emitter of the ultrasonic sensor 318 may be used to transmit data and the detector may be used to receive data transmitted that is ultrasonic sound. In another example, the emitter of an ultrasonic sensor 318 may be set to a particular frequency and used to generate a particular waveform such as a sawtooth pattern to provide a signal that is audible to an animal, such as a dog or a cat.

An optical sensor 320 may provide sensor data 122 indicative of one or more of a presence or absence of an object, a distance to the object, or characteristics of the object. The optical sensor 320 may use time-of-flight (ToF), structured light, interferometry, or other techniques to generate the distance data 126. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 320 may utilize one or more sensing elements. For example, the optical sensor 320 may comprise a 4×4 array of light sensing elements. Each individual sensing element may be associated with a field of view (FOV) that is directed in a different way. For example, the optical sensor 320 may have four light sensing elements, each associated with a different 10° FOV, allowing the sensor to have an overall FOV of 40°.

In another implementation, a structured light pattern may be provided by the optical emitter. A portion of the structured light pattern may then be detected on the object using a sensor 118 such as an image sensor or camera 344. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 320 may operate as a depth camera, providing a two-dimensional image of a scene, as well as data that indicates a distance to each pixel.

Data from the optical sensors 320 may be utilized for collision avoidance. For example, the safety module 216 and the autonomous navigation module 158 may utilize the sensor data 122 indicative of the distance to an object in order to prevent a collision with that object.

Multiple optical sensors 320 may be operated such that their FOV overlap at least partially. To minimize or eliminate interference, the optical sensors 320 may selectively control one or more of the timing, modulation, or frequency of the light emitted. For example, a first optical sensor 320 may emit light modulated at 30 kHz while a second optical sensor 320 emits light modulated at 33 kHz.

A lidar 322 sensor provides information indicative of a distance to an object or portion thereof by utilizing laser light. The laser is scanned across a scene at various points, emitting pulses which may be reflected by objects within the scene. Based on the time-of-flight distance to that particular point, sensor data 122 such as distance data 126 may be generated that is indicative of the presence of objects and the relative positions, shapes, and so forth that are visible to the lidar 322. Data from the lidar 322 may be used by various modules. For example, the autonomous navigation module 158 may utilize point cloud data generated by the lidar 322 for localization of the AMD 106 within the physical space 102.

The AMD 106 may include a mast. A mast position sensor 324 provides information indicative of a position of the mast of the AMD 106. For example, the mast position sensor 324 may comprise limit switches associated with the mast extension mechanism that indicate whether the mast is at an extended or retracted position. In other implementations, the mast position sensor 324 may comprise an optical code on at least a portion of the mast that is then interrogated by an optical emitter and a photodetector to determine the distance to which the mast is extended. In another implementation, the mast position sensor 324 may comprise an encoder wheel that is attached to a mast motor that is used to raise or lower the mast. The mast position sensor 324 may provide data to the safety module 216. For example, if the AMD 106 is preparing to move, data from the mast position sensor 324 may be checked to determine if the mast is retracted, and if not, the mast may be retracted prior to beginning movement.

A mast strain sensor 326 provides information indicative of a strain on the mast with respect to the remainder of the AMD 106. For example, the mast strain sensor 326 may comprise a strain gauge or load cell that measures a sideload applied to the mast or a weight on the mast or downward pressure on the mast. The safety module 216 may utilize sensor data 122 obtained by the mast strain sensor 326. For example, if the strain applied to the mast exceeds a threshold amount, the safety module 216 may direct an audible and visible alarm to be presented by the AMD 106.

The AMD 106 may include a modular payload bay. A payload weight sensor 328 provides information indicative of the weight associated with the modular payload bay. The payload weight sensor 328 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 328 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 328 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 216 may utilize the payload weight sensor 328 to determine if the modular payload bay has been overloaded. If so, an alert or notification may be issued.

One or more device temperature sensors 330 may be utilized by the AMD 106. The device temperature sensors 330 provide temperature data of one or more components within the AMD 106. For example, a device temperature sensor 330 may indicate a temperature of one or more of the batteries 108, one or more motors 110, and so forth. In the event the temperature exceeds a threshold value, the component associated with that device temperature sensor 330 may be shut down.

One or more interlock sensors 332 may provide data to the safety module 216 or other circuitry that prevents the AMD 106 from operating in an unsafe condition. For example, the interlock sensors 332 may comprise switches that indicate whether an access panel is open. The interlock sensors 332 may be configured to inhibit operation of the AMD 106 until the interlock switch indicates a safe condition is present.

A gyroscope 334 may provide information indicative of rotation of an object affixed thereto. For example, a gyroscope 334 may generate sensor data 122 that is indicative of a change in orientation of the AMD 106 or a portion thereof.

An accelerometer 336 provides information indicative of a direction and magnitude of an imposed acceleration. Data such as rate of change, determination of changes in direction, speed, and so forth may be determined using the accelerometer 336. The accelerometer 336 may comprise mechanical, optical, micro-electromechanical, or other devices. For example, the gyroscope 334 in the accelerometer 336 may comprise a prepackaged solid-state inertial measurement unit (IMU) that provides multiple axis gyroscopes 334 and accelerometers 336.

A magnetometer 338 may be used to determine an orientation by measuring ambient magnetic fields, such as the terrestrial magnetic field. For example, the magnetometer 338 may comprise a Hall effect transistor that provides output compass data indicative of a magnetic heading.

The AMD 106 may include one or more location sensors 340. The location sensors 340 may comprise an optical, radio, or other navigational system such as a global positioning system (GPS) receiver. For indoor operation, the location sensors 340 may comprise indoor position systems, such as using Wi-Fi Positioning Systems (WPS). The location sensors 340 may provide information indicative of a relative location, such as "living room" or an absolute location such as particular coordinates indicative of latitude and longitude, or displacement with respect to a predefined origin.

A photodetector 342 provides sensor data 122 indicative of impinging light. For example, the photodetector 342 may provide data indicative of a color, intensity, duration, and so forth.

A camera 344 generates sensor data 122 indicative of one or more images. The camera 344 may be configured to detect light in one or more wavelengths including, but not limited to, terahertz, infrared, visible, ultraviolet, and so forth. For example, an infrared camera 344 may be sensitive to wavelengths between approximately 700 nanometers and 1 millimeter. The camera 344 may comprise charge coupled devices (CCD), complementary metal oxide semiconductor (CMOS) devices, microbolometers, and so forth. The AMD 106 may use one or more of image data 124 acquired by the camera 344 for object recognition, navigation, collision avoidance, user 104 communication, and so forth. For example, a pair of cameras 344 sensitive to infrared light may be mounted on the front of the AMD 106 to provide binocular stereo vision, with the sensor data 122 comprising images being sent to the autonomous navigation module 158. In another example, the camera 344 may comprise a 10 megapixel or greater camera that is used for videoconferencing or for acquiring pictures for the user 104.

One or more microphones 346 may be configured to acquire information indicative of sound present in the physical space 102. In some implementations, arrays of microphones 346 may be used. These arrays may implement beamforming techniques to provide for directionality of gain. The AMD 106 may use the one or more microphones 346 to acquire information from acoustic tags, accept voice input from users 104, determine a direction of an utterance, determine ambient noise levels, for voice communication with another user 104 or system, and so forth.

An air pressure sensor 348 may provide information indicative of an ambient atmospheric pressure or changes in ambient atmospheric pressure. For example, the air pressure sensor 348 may provide information indicative of changes in air pressure due to opening and closing of doors, weather events, and so forth.

An air quality sensor 350 may provide information indicative of one or more attributes of the ambient atmosphere. For example, the air quality sensor 350 may include one or more chemical sensing elements to detect the presence of carbon monoxide, carbon dioxide, ozone, and so forth. In another example, the air quality sensor 350 may comprise one or more elements to detect particulate matter in the air, such as the photoelectric detector, ionization chamber, and so forth. In another example, the air quality sensor 350 may include a hygrometer that provides information indicative of relative humidity.

An ambient light sensor 352 may comprise one or more photodetectors 342 or other light-sensitive elements that are used to determine one or more of the color, intensity, or duration of ambient lighting around the AMD 106.

An ambient temperature sensor 354 provides information indicative of the temperature of the ambient physical space 102 proximate to the AMD 106. In some implementations, an infrared temperature sensor may be utilized to determine the temperature of another object at a distance.

A floor analysis sensor 356 may include one or more components that are used to generate at least a portion of the floor characterization data. In one implementation, the floor analysis sensor 356 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 356 may be used by one or more of the safety module 216, the autonomous navigation module 158, the task module 150, and so forth. For example, if the floor analysis sensor 356 determines that the floor is wet, the safety module 216 may decrease the speed of the AMD 106 and generate a notification alerting the user 104.

The floor analysis sensor 356 may include other components as well. For example, a coefficient of friction sensor may comprise a probe that comes into contact with the surface and determines the coefficient of friction between the probe and the floor.

A caster rotation sensor 358 provides data indicative of one or more of a direction of orientation, angular velocity, linear speed of the caster, and so forth. For example, the caster rotation sensor 358 may comprise an optical encoder and corresponding target that is able to determine that the caster transitioned from an angle of 0° at a first time to 49° at a second time.

The sensors 118 may include a radar 360. The radar 360 may be used to provide information as to a distance, lateral position, and so forth, to an object. For example, the radar 360 may be used to generate the distance data 126.

The sensors 118 may include a passive infrared (PIR) sensor 362. The PIR 362 may be used to detect the presence of users 104, pets, hotspots, and so forth. For example, the PIR sensor 362 may be configured to detect infrared radiation with wavelengths between 8 and 14 micrometers.

The AMD 106 may include other sensors 364 as well. For example, a capacitive proximity sensor may be used to provide proximity data to adjacent objects. Other sensors 364 may include radio frequency identification (RFID) readers, near field communication (NFC) systems, coded aperture cameras, and so forth. For example, NFC tags may be placed at various points within the physical space 102 to provide landmarks for the autonomous navigation module 158. One or more touch sensors may be utilized to determine contact with a user 104 or other objects.

The AMD 106 may include one or more output devices 148. A motor 110 may be used to provide linear or rotary motion. A light 382 may be used to emit photons. A speaker 384 may be used to emit sound. A display 386 may comprise one or more of a liquid crystal display, light emitting diode display, electrophoretic display, cholesteric liquid crystal display, interferometric display, and so forth. The display 386 may be used to present visible information such as graphics, pictures, text, and so forth. In some implementations, the display 386 may comprise a touchscreen that combines a touch sensor and a display 386.

In some implementations, the AMD 106 may be equipped with a projector 388. The projector 388 may be able to project an image on a surface, such as the floor, wall, ceiling, and so forth.

A scent dispenser 390 may be used to emit one or more smells. For example, the scent dispenser 390 may comprise a plurality of different scented liquids that may be evaporated or vaporized in a controlled fashion to release predetermined amounts of each.

One or more moveable component actuators 392 may comprise an electrically operated mechanism such as one or more of a motor, solenoid, piezoelectric material, electroactive polymer, shape-memory alloy, and so forth. The actuator controller may be used to provide a signal or other input that operates one or more of the moveable component actuators 392 to produce movement of the moveable component.

In other implementations, other 394 output devices may be utilized. For example, the AMD 106 may include a haptic output device that provides output that produces particular touch sensations to the user 104.

Figure 4:
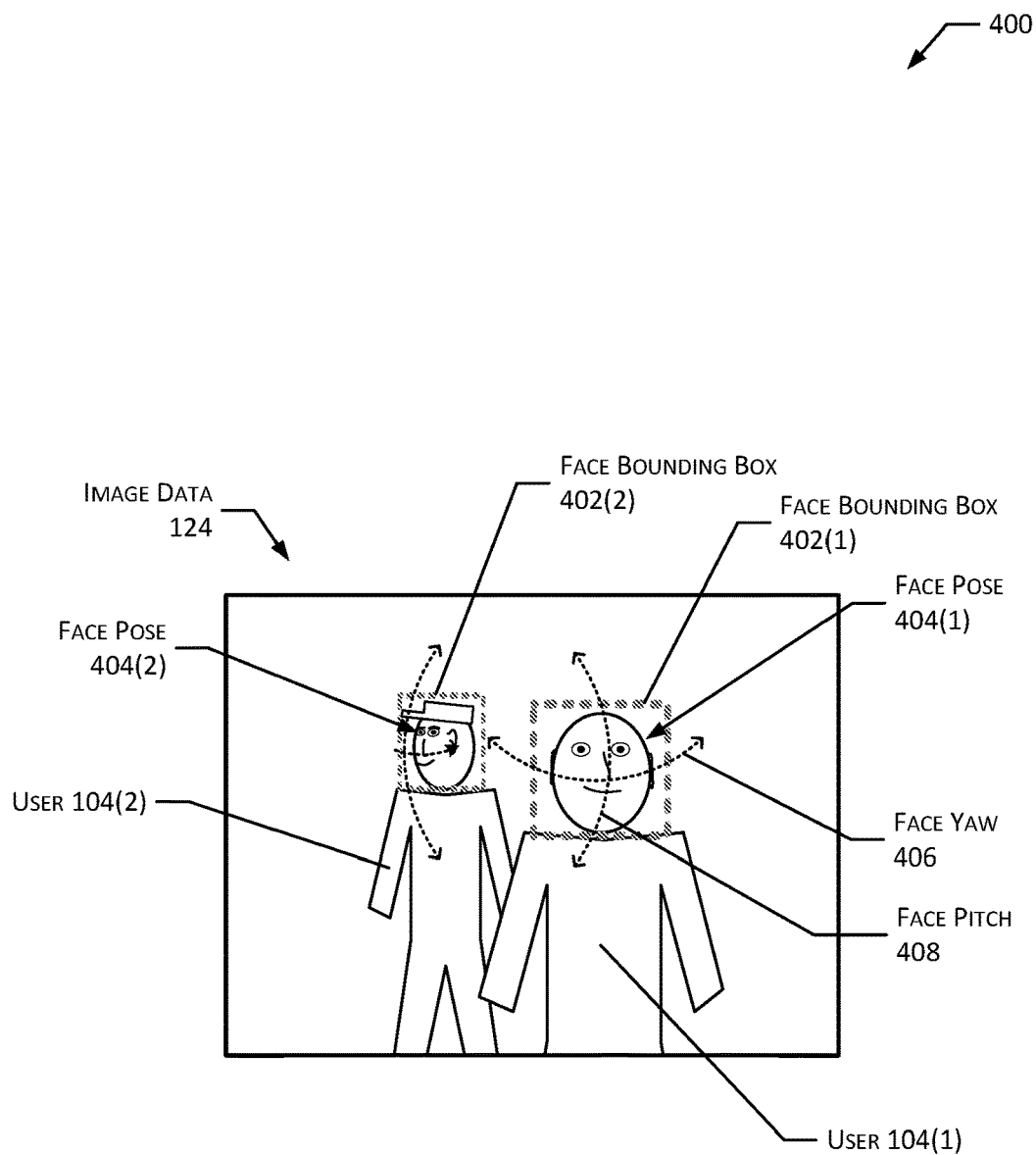
FIG. 4 depicts image data and face pose, according to some implementations.

FIG. 4 depicts image data and face pose, according to some implementations. The engagement module 140 may process the image data 124 using a face detection algorithm to detect one or more faces depicted in the image. Once detected, a face bounding box 402 may be determined. The face bounding box 402 designates a portion of the image that is deemed to contain a face. In some implementations, a confidence value may be provided by the engagement module 140 that is indicative of a likelihood that the face bounding box 402 includes a face of the user. For example, a neural network may determine a confidence value associated with output indicative of the face bounding box 402.

The engagement module 140 may also determine information about the bounding boxes. Each bounding box has a width and height as measured with respect to the image. The width and height may be expressed or measured as a number of pixels, percentage of image, and so forth. For example, the face bounding box 402(1) associated with the image data 124(1) may have a height H1 of 127 pixels and a width W1 of 127 pixels. A bounding box area associated with a bounding box may also be determined by multiplying the height and the width. For example, a face area may be determined by multiplying the height and width of the face bounding box 402.

In some implementations, the engagement module 140 may provide as output information about keypoints or landmarks that are represented by the image data 124. This information may include coordinates with respect to the image, tags indicative of the keypoint, count of keypoints, confidence values of keypoints, and so forth. Keypoints may be determined by the neural network that are associated with joints on the human body, facial features, and so forth. Keypoints may include one or more of body keypoints or face keypoints. For example, the neural network may determine the body keypoints such as a location in the image of a wrist, elbow, shoulder, and so forth. In another example, the neural network may determine the face keypoints such as a location in the image of an eye, mouth, nose, ear, and so forth. In one implementation, the engagement module 140 may use the facial landmark application programming interface (API) "Facemark" in OpenCV.

The engagement module 140 may determine face pose data indicative of a face pose 404. A face pose 404 may be representative of a face yaw 406 and a face pitch 408 of the face of the user, relative to the image sensor or the camera 344. For example, the face yaw 406 and face pitch 408 may be described as being relative to a line extending orthogonally from a plane of the face of the user defined by the eyes and mouth relative to a line extending perpendicular to a plane of the image data 124. In some implementations a face roll may be determined. The face roll may be described as rotation of the face plane relative to a line extending from a midpoint between the eyes through a center of the mouth. In one implementation the face pose 404 may be indicative of an angle of one or more of face yaw 406, face pitch 408, or roll.

In one implementation, the engagement module 140 may determine keypoints or landmarks that are associated with a face of the user as represented in the image data 124. These keypoints may then be processed to determine one or more of the face yaw 406, face pitch 408, roll, and so forth. For example, the relative locations of the keypoints may be processed using a Perspective-n-Point algorithm to estimate the pose of the face of the user relative to the camera.

In another implementation, the face pose data may comprise data indicative of a relative pose. For example, a neural network may provide as an output face pose data that is indicative of the apparent pose of the face of the user in the image and may be indicative of a relative pose such as "oriented left", "oriented right", "oriented up", "oriented down", or "towards camera". Particular values may be associated with respective relative poses, and the equations as described herein may be used with these particular values.

The engagement module 140 may also use distance data 126 to the user 104 associated with a face of the user in the image data 124. The distance data 126 may be determined using one or more distance sensors, such as a pair of cameras 344 operating as a stereocamera, ultrasonic sensor 318, optical sensor 320, lidar 322, radar 360, and so forth. In other implementations the distance data 126 may be determined based on the image data 124. For example, one or more of the height or width in pixels of the face bounding box 402 may be used to approximate a distance 144 between the user 104 and the AMD 106. Continuing the example, a width of 100 pixels may correspond to a distance of 1 m while a width of 50 pixels may correspond to a distance of 2 meters. A lookup table or calculation may be performed to determine the distance data 126 based on one or more characteristics of the face bounding box 402. In some implementations, the engagement module 140 may use the pixel measurements, without conversion to distance, to determine the user engagement score 146.

Figure 5:
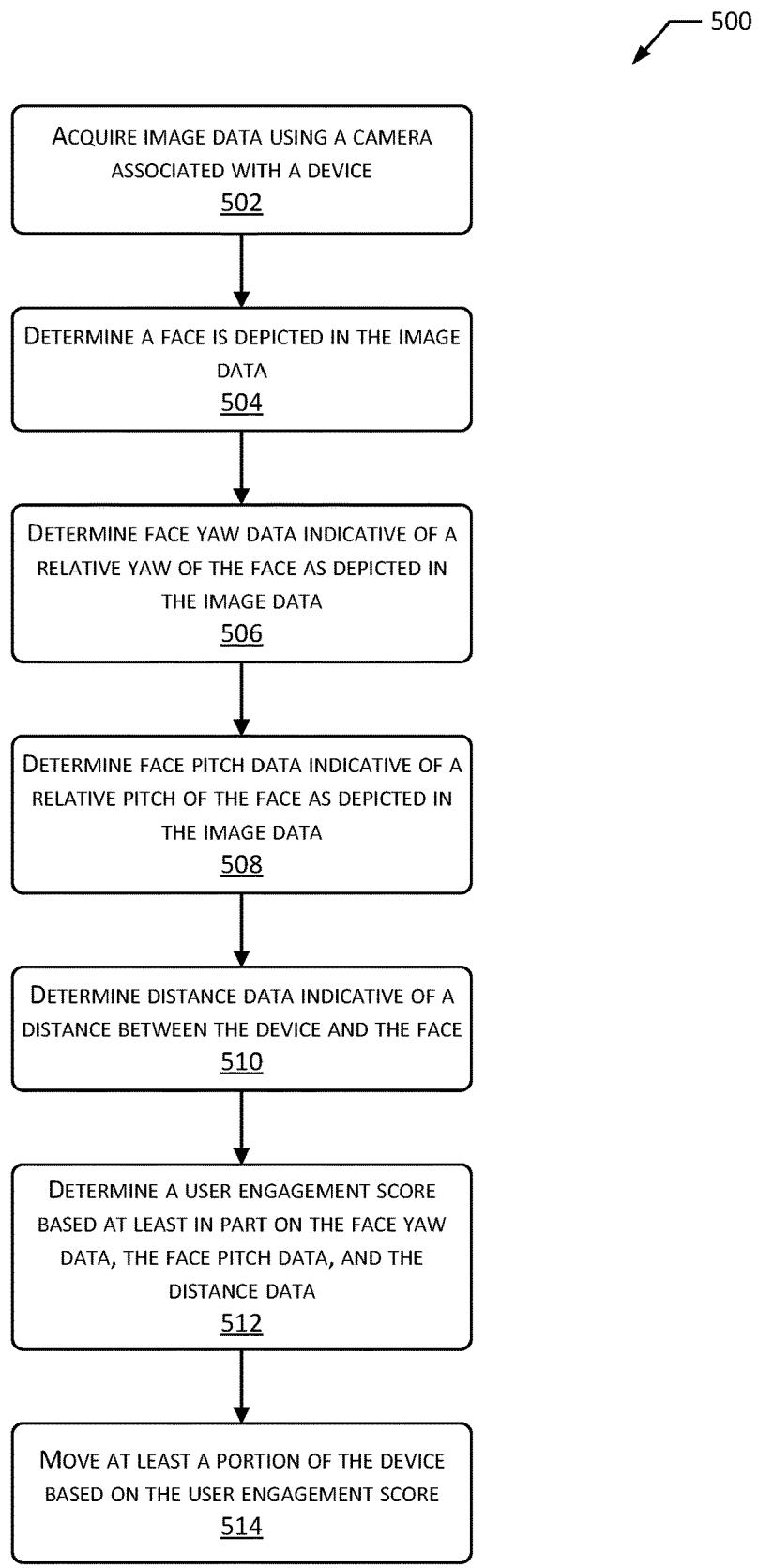
FIG. 5 is a flow diagram of a process for determining a user engagement score, according to some implementations.

FIG. 5 is a flow diagram 500 of a process for determining a user engagement score 146, according to some implementations. The process may be implemented at least in part by one or more of the AMD 106, the docking station 162, the servers 164, or other devices 166.

At 502 image data 124 is acquired using a camera 344 associated with a device. For example, a camera 344 attached to an AMD 106 or another device may be operated to acquire the image data 124.

At 504 a determination is made as to whether a face of the user is depicted in the image data 124. For example, the engagement module 140 may process the image data 124 using a face detection algorithm to determine a face bounding box 402 that designates a portion of the image data 124 is likely to contain a face. In some implementations, a confidence value may be determined that is indicative of a likelihood that a face has been detected. In some implementations, if the confidence value for the determination of the face is less than a threshold value, the process may stop. If the confidence value is greater than the threshold value, the process may proceed.

A first set of one or more values are determined that are indicative of attributes associated with the face of the user that is depicted in the image data 124. In one implementation, these attributes may include face yaw 406, face pitch 408, and distance data 126. In other implementations, values for other attributes may be determined as well. Attributes are also discussed with regard to FIG. 6.

At 506 face yaw data is determined that is indicative of a relative yaw of the face of the user as depicted in the image data 124. In one implementation, the engagement module 140 may process the portion of the image data 124 within the face bounding box 402 with an artificial neural network to determine the face yaw 406. For example, the engagement module 140 may process the image data 124 with a trained artificial neural network that provides as output the face yaw 406. In another example, the engagement module 140 may process the image data 124 with a trained artificial neural network that provides as point the locations of keypoints of the face of the user. The keypoints may then be processed using the perspective-n-point algorithm to determine the relative pose of the face of the user. Once the relative pose is determined, the face yaw 406 may be determined.

At 508 face pitch data is determined that is indicative of a relative pitch of the face of the user as depicted in the image data 124. As described above, in one implementation, the engagement module 140 may process the portion of the image data 124 within the face bounding box 402 with an artificial neural network to determine the face pitch 408. In another implementation, keypoints of the face of the user may be determined and used to determine the relative pose of the face of the user. Once the relative pose is determined, the face pitch 408 may be determined.

At 510 distance data 126 indicative of a distance 144 between the device and the face of the user is determined. In one implementation, data from one or more distance sensors may be used to determine the distance 144. In another implementation, the image data 124 may be processed to determine the distance 144.

At 512 a user engagement score 146 is determined based at least in part on the face yaw data, the face pitch data, and the distance data 126. For example, equations 1-4 may be used to determine the user engagement score 146.

Information indicative of a confidence value associated with at least one of the first set of one or more values may be used to determine the user engagement score 146. For example, a confidence value indicative of a likelihood that at least one of the one or more values in the first set of values are correct may be used to calculate the user engagement score 146.

In a first implementation the user engagement score 146 may be an aggregate of data from a plurality of image data 124. In one implementation, the first set of one or more values may be determined for a first image, while a second set of one or more values are determined for a second image. The user engagement score 146 may be based on the first set and the second set of one or more values. For example, an average of the face yaw, an average of the face pitch, and an average of the distance may be used to determine the user engagement score 146.

In a second implementation, the user engagement score 146 may be determined for each frame in the image data 124, and then used to generate an overall or aggregate user engagement score 146. For example, 24 frames of image data 124 may be processed to determine 24 discrete user engagement scores 146. These discrete user engagement scores 146 may be processed to determine the user engagement score 146. For example, an exponential smoothing function, average function, minimum function, maximum function, and so forth may be used.

In implementations where the image data 124 comprises a plurality of frames or individual images, the user 104 may be determined to be the same user 104 based on one or more of apparent displacement in the image data 124 of the face bounding box 402, distance data 126, facial recognition, and so forth. For example, a face bounding box 402 for a first user 104(1) depicted in a first frame having a corner at pixel location (476,994) may be deemed to be representative of the same user if the corner of the face bounding box 402 in the second frame is within 10 pixels. In other implementations, other techniques may be used to maintain continuity of analysis for the same user 104 across a plurality of frames. For example, optical flow, blob tracking, and so forth.

At 514 the AMD 106 is operated based at least in part on the user engagement score 146. In one implementation, at least a portion of the AMD 106 is moved based on the user engagement score 146. For example, the AMD 106 may operate an actuator to move one or more of the camera 344, the display 386, or the entire AMD 106 to follow the user 104 with the greatest user engagement score 146.

In another example, the user engagement score 146 may be used to select a particular user 104 to track while a video call facilitated by the AMD 106 is in progress. For example, if a plurality of users 104 are in the sensor FOV 120 of the camera 344, the user 104 associated with the greatest user engagement score 146 may be selected for tracking. In another example, if the greatest user engagement score 146 for the users 104 within the sensor FOV 120 is less than a threshold value, the AMD 106 may discontinue a task. For example, if no user engagement score 146 is greater than a threshold value for a specified interval of time, the AMD 106 may discontinue presentation of content. Continuing the example, if no user 104 is looking at the AMD 106 for at least 5 minutes, the AMD 106 may stop presenting a movie on the display 386.

FIG. 6 illustrates at 600 some attributes that may be used to determine the user engagement score 146, according to some implementations. During operation, the engagement module 140 or other modules, may determine values for one or more attributes that are associated with the user 104. FIG. 6 is illustrated as a table by way of example, and not necessarily as a limitation. Other data structures may be used.

Each face detected in the image data 124 may be associated with a user identifier 602. The user identifier 602 may be a relative identifier, used to distinguish one person from another, without necessarily being indicative of an absolute identity. For example, if two users 104 are depicted in the image data 124, each may be assigned an arbitrary user identifier 602. If a user 104 were to leave the sensor FOV 120 and return many minutes later, that user 104 may be assigned a different user ID 602. In some implementations facial recognition or other techniques may be used to assert an absolute identity, such as "John Q. Smith". For example, the users 104 may have opted in for an identification service to enable various functionality, and have been enrolled in the system.

The engagement module 140 may determine one or more attributes 604 that are associated with the user 104 depicted in the image data 124. A mouth open 606 attribute 604 provides information as to whether the mouth of the user depicted in the image data 124 is open or closed. For example, if the mouth open 606 indicates a value of "1", the mouth may be open. The mouth open 606 attribute may be indicative of the user 104 speaking or otherwise being engaged with respect to the AMD 106.

An eyes open 608 attribute 604 provides information as to whether the eyes of the user in the image data 124 are open or closed. For example, if both eyes are closed, the eyes open 608 may have a value of "0", while both eyes open may have a value of "2".

The face yaw data 610 is indicative of the face yaw 406. The face yaw data 610 may be specified in degrees. At 0 degrees of face yaw 406, a line extending orthogonally from a plane of the face of the user defined by the eyes and mouth may be pointing at the camera 344.

The face pitch data 612 is indicative of the face pitch 408. The face pitch data 612 may be specified in degrees. At 0 degrees of face pitch 406, a line extending orthogonally from a plane of the face of the user defined by the eyes and mouth may be pointing at the camera 344.

The attributes 604 may include the distance data 126. The distance data 126 may indicate the distance 144 to the user 104 associated with the face. In some implementations this may be the distance 144 to the face of the user itself, or a distance 144 to some other part of the user 104 who is associated with the face of the user. For example, the distance 144 may be measured by the radar 360 to the torso of the user 104.

A speech detected 614 attribute 604 may be indicative of whether speech is detected in audio data obtained from the one or more microphones 346. For example, audio data may be acquired at a time corresponding to the image data 124. The audio data may be processed with a speech detection algorithm to determine if speech sounds are present. Continuing the example, a zero crossing rate may be used to determine if speech is present.

In some implementations a plurality of microphones 346 in a microphone array may be used. The microphone array may use one or more beamforming or other processing techniques to determine a first direction, relative to the AMD 106, that is associated with a sound.

A second direction may be determined that is indicative of the direction of the face of the user 104 depicted in the image data 124 relative to the AMD 106. Given a known relative physical arrangement of the camera 344 with respect to the microphone array, the position of the face bounding box 402 in the image data 124 may be associated with a direction relative to the camera 344 and thus the AMD 106.

The first direction that is indicative of the source of the sound, and the second direction that is indicative of a direction of the user 104 depicted in the image data 124 may be compared. If the second direction is within a threshold value of the first direction, the sound may be deemed to originate from the user 104 located in that direction. As a result, the sound may be associated with a particular user 104, and used to determine the user engagement score 146 for that user 104. Continuing the example, if that sound is determined to be indicative of speech, and that speech is coming from the direction of user 104(1), then user 104(1) may be deemed to be speaking.

In some implementations the attributes 604 may have values determined over some interval of time. For example, the mouth open 606 attribute for individual frames of video data may be processed to determine if there is a change in state, that is open to closed during some interval of time. A determination as to a change in state during the interval of time may be used to determine the user engagement score 146.

In this illustration, the user engagement score 146 for the respective users 104(1) and 104(2) as shown in FIGS. 1 and 4 is shown. Using equations 1-4, the user engagement score 146(1) for user 104(1) is calculated as 0.878 while user 104(2) has a user engagement score 146(2) of 0.530.

The AMD 106 may be operated based at least in part on the user engagement score(s) 146. For example, while presenting output on the display 386, the AMD 106 may pan the display 386 to point at the user 104 while the user 104 moves around the physical space 102. This allows the user 104 to more easily see the display 386, rather than viewing the display 386 at an angle. However, if two users 104 are within the sensor FOV 120 of the camera 344, which user 104 should the display 386 be pointed towards? By determining the user engagement scores 146, the AMD 106 may operate to track the user 104 associated with the greatest user engagement score 146. Continuing the example, user 104(1) would be tracked as the first user engagement score 146(1) of 0.878 is greater than the second user engagement score 146(2) of 0.530.

By using the techniques described, the AMD 106 is able to quickly and efficiently determine which user 104 in a group of users 104 is likely to be the most engaged with the AMD 106. Operation of the AMD 106 that takes into account the user engagement score 146 results in a more natural and consistent behavior, resulting in a significant improvement in user experience. The user engagement score 146 may be determined from a single image, or from several frames of image data 124 from video. The overall process is computationally efficient, reducing power consumption and extending the battery life of the AMD.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:
1. A device comprising:
  a camera;
  one or more memories storing first computer-executable instructions; and one or more processors to execute the first computer-executable instructions to:
acquire a first image using the camera;
determine a face of a user is depicted in the first image;
determine a first set of one or more values indicative of attributes associated with the face of the user depicted in the first image;
determine a first score based at least in part on the first set of one or more values;
acquire a second image using the camera;
determine that the second image depicts the face of the user;
determine, based on the second image, a second set of one or more values indicative of the attributes associated with the face of the user that is depicted in the second image;
determine, based at least in part on the second set of one or more values, a second score;
determine an aggregate score for the user, based at least in part on the first score and the second score;
determine the aggregate score is greater than a first threshold value; and
operate the device based at least in part on the aggregate score.

2. The device of claim 1, further comprising a sensor, the sensor comprising one or more of:
an ultrasonic sensor,
an optical time of flight sensor,
a radar,
a lidar, or
a second camera;
wherein the attributes associated with the face of the user as depicted in the first image comprise one or more of:
a relative yaw of the face of the user as depicted in the first image relative to the camera,
a relative pitch of the face of the user as depicted in the first image relative to the camera, or
a distance between the sensor and the user; and
the one or more processors to further execute the first computer-executable instructions to:
determine a first portion of the first image that is associated with the face of the user;
determine one or more image metrics associated with the first portion, the image metrics comprising one or more of height of the first portion as measured in pixels, width of the first portion as measured in pixels, or area of the first portion as measured in pixels; and
determine the first score based on the one or more image metrics.

3. A device comprising:
one or more sensors comprising a camera;
one or more memories storing computer-executable instructions; and
one or more processors to execute the computer-executable instructions to:
acquire a first image using the camera;
determine, based on the first image, a first set of one or more values indicative of attributes associated with a face of a user that is depicted in the first image;
determine, based at least in part on the first set of one or more values, a first score;
acquire a second image using the camera;
determine that the second image depicts the face of the user;
determine, based on the second image, a second set of one or more values indicative of the attributes associated with the face of the user that is depicted in the second image;
determine, based at least in part on the second set of one or more values, a second score;
determine an aggregate score for the user, based at least in part on the first score and the second score;
determine the aggregate score is greater than a first threshold value; and
operate the device based at least in part on the aggregate score.

4. The device of claim 3, the one or more sensors further comprising a microphone array; and the one or more processors to further execute the computer-executable instructions to:
acquire audio data using the microphone array;
determine a first direction associated with the audio data;
determine a second direction of the face of the user relative to the device based at least in part on the first image;
determine the second direction is within a second threshold value of the first direction; and
determine the first score based on the second direction being within the second threshold value of the first direction.

5. The device of claim 3, the one or more processors to further execute the computer-executable instructions to:
determine a first portion of the first image that is associated with the face of the user;
determine one or more image metrics associated with the first portion, the image metrics comprising one or more of height of the first portion as measured in pixels, width of the first portion as measured in pixels, or area of the first portion as measured in pixels; and
determine the first score based on the one or more image metrics.

6. The device of claim 3, the one or more sensors further comprising one or more of:
an ultrasonic sensor,
an optical time of flight sensor,
a radar,
a lidar, or
a second camera; and
the one or more processors to further execute the computer-executable instructions to:
determine distance data indicative of a distance to the user associated with the face of the user; and
determine the first score based on the distance data.

7. The device of claim 3, wherein the attributes associated with the face of the user depicted in the first image comprise one or more of:
a yaw of the face of the user relative to the camera,
a pitch of the face of the user relative to the camera,
a mouth of the user being open or closed, or
eyes of the user being open or closed; and
the one or more processors to further execute the computer-executable instructions to:
determine a confidence value associated with the first set of one or more values, wherein the confidence value is indicative of a likelihood that the one or more values are correct; and
determine the first score based on the confidence value.

8. The device of claim 3, the one or more processors to further execute the computer-executable instructions to:
determine a confidence value associated with at least one of the first set of one or more values, wherein the confidence value is indicative of a likelihood that the at least one of the one or more values is correct;
determine the confidence value is greater than a second threshold value; and
determine the first score responsive to the confidence value being greater than the second threshold value.

9. The device of claim 3, wherein:
the aggregate score is determined using an exponential smoothing function, an average function, a minimum function, or a maximum function.

10. The device of claim 3, further comprising:
a motor; and
the one or more processors to further execute the computer-executable instructions to:
responsive to the aggregate score, operate the motor to move at least a portion of the device.

11. A method comprising:
acquiring audio data using a microphone array associated with a device;
determining a first direction associated with the audio data;
acquiring a first image using a camera associated with the device;
determining, based on the first image, a first set of one or more values indicative of attributes associated with a face of a user that is depicted in the first image;
determining a second direction of the face of the user relative to the device based at least in part on the first image;
determining the second direction is within a first threshold value of the first direction;
determining, based at least in part on the first set of one or more values and the second direction being within the first threshold value of the first direction, a first score indicative of user engagement with the device; and
operating the device based at least on the first score.

12. The method of claim 11, wherein the operating the device comprises:
presenting output using one or more of a display or a speaker, responsive to the first score being greater than a second threshold value; or
preventing presentation of output from the one or more of the display or the speaker, responsive to the first score being less than the second threshold value.

13. The method of claim 11, wherein the operating the device comprises:
moving at least a portion of the device based at least in part on the first score.

14. The method of claim 11, the attributes comprising one or more of:
face yaw data indicative of a yaw of the face of the user as depicted in the first image relative to the camera,
face pitch data indicative of a pitch of the face of the user as depicted in the first image relative to the camera,
mouth open data indicative of a mouth of the user being open or closed, or
eyes open data indicative of whether eyes of the user are open or closed.

15. The method of claim 11, further comprising:
determining distance data indicative of a distance to the user associated with the face; and
determining the first score based on the distance data.

16. The method of claim 11, further comprising:
determining a first portion of the first image that is associated with the face of the user;
determining one or more image metrics associated with the first portion, the image metrics comprising one or more of: height of the first portion as measured in pixels, width of the first portion as measured in pixels, or area of the first portion as measured in pixels; and
determining the first score based on the one or more image metrics.

17. The method of claim 11, further comprising:
determining a confidence value associated with the first set of one or more values, wherein the confidence value is indicative of a likelihood that the one or more values are correct; and
determining the first score based on the confidence value.

18. The method of claim 11, further comprising:
determining a confidence value associated with the first set of one or more values, wherein the confidence value is indicative of a likelihood that the one or more values are correct;
determining the confidence value is greater than a second threshold value; and
determining the first score responsive to the confidence value being greater than the second threshold value.

19. The method of claim 11, further comprising:
acquiring a second image using the camera associated with the device;
determining that the second image depicts the face of the user that is associated with the first image;
determining, based on the second image, a second set of one or more values indicative of the attributes associated with the face of the user that is depicted in the second image;
determining, based at least in part on the second set of one or more values, a second score;
determining an aggregate score based at least in part on the first score and the second score;
determining the aggregate score is greater than a second threshold value; and
operating the device based at least in part on the aggregate score.

20. The method of claim 19, wherein the aggregate score is determined using an exponential smoothing function, an average function, a minimum function, or a maximum function.

* * * * *